(12) United States Patent
Zhang et al.

(10) Patent No.: US 10,476,728 B2
(45) Date of Patent: Nov. 12, 2019

(54) PROBABILISTIC SHAPING FOR ARBITRARY MODULATION FORMATS

(71) Applicant: NEC Laboratories America, Inc., Princeton, NJ (US)

(72) Inventors: Shaoliang Zhang, Princeton, NJ (US); Fatih Yaman, Princeton, NJ (US); Ting Wang, West Windsor, NJ (US); Zhen Qu, Tucson, AZ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/153,029

(22) Filed: Oct. 5, 2018

(65) Prior Publication Data
US 2019/0109752 A1   Apr. 11, 2019

Related U.S. Application Data

(60) Provisional application No. 62/569,637, filed on Oct. 9, 2017.

(51) Int. Cl.
*H04B 10/04* (2006.01)
*H04L 27/34* (2006.01)
(Continued)

(52) U.S. Cl.
CPC ....... *H04L 27/345* (2013.01); *H04B 10/5161* (2013.01); *H04B 10/541* (2013.01);
(Continued)

(58) Field of Classification Search
CPC .. H04B 10/516; H04B 10/541; H04B 10/548; H04B 10/5161; H04B 10/5561; H04B 10/2507; H03M 13/255; H03M 13/3916
(Continued)

(56) References Cited

U.S. PATENT DOCUMENTS

2013/0071119 A1*  3/2013  Liu ................. H04B 10/25137
                                                               398/65
2015/0372766 A1* 12/2015  Yoshida ........... H04B 10/2507
                                                               398/193

OTHER PUBLICATIONS

Buchali et al., "Rate Adaptation and Reach Increase by Probabilistically Shaped 64-QAM: An Experimental Demonstration", Journal of Lightwave Technology, Dec. 2015, 12 pages.
(Continued)

*Primary Examiner* — Hanh Phan
(74) *Attorney, Agent, or Firm* — Joseph Kolodka

(57) ABSTRACT

Systems and methods for optical data transport, including controlling data transport across an optical transmission medium by generating two-dimensional (2D) distribution matchers (DMs) based on probabilistic fold shaping (PFS) and arbitrary probabilistic shaping (APS). The 2D PFS-based DM is can encode any N-fold rotationally symmetrical Quadrature Amplitude Modulation (QAM) format by applying the 2D PFS-based DM only to symbols in one quadrant based on a target entropy. A fold index yield uniform distribution is determined, and is utilized to carry generated uniform distributed parity check bits across the optical transmission medium. The 2D APS-based DM can encode any arbitrary modulation formats by encoding uniform binary data to generate non-uniform target symbols, and generating a probability distribution for the target symbols by indirectly applying the 2D APS-based DM based on a target probability distribution and a detected code rate of generated FEC code.

18 Claims, 10 Drawing Sheets

(51) Int. Cl.
*H04B 10/516* (2013.01)
*H04L 1/00* (2006.01)
*H04B 10/61* (2013.01)
*H04B 10/54* (2013.01)

(52) U.S. Cl.
CPC ......... *H04B 10/616* (2013.01); *H04L 1/0058* (2013.01); *H04L 1/0061* (2013.01); *H04L 27/3405* (2013.01)

(58) Field of Classification Search
USPC ....... 398/183, 186, 188, 192, 913, 194, 158, 398/159, 25, 135, 136, 193
See application file for complete search history.

(56) References Cited

OTHER PUBLICATIONS

Schulte et al., "Constant Composition Distribution Matching", arXiv:1503.05133v1 [cs.IT] Mar. 17, 2015, pp. 1-5.

* cited by examiner

PROBABILISTIC SHAPING FOR ARBITRARY MODULATION FORMATS

BACKGROUND

Technical Field

The present invention relates to data transport, and more particularly to data transport using distribution matching and probabilistic shaping for any type of modulation format.

Description of the Related Art

Recently, both geometrical shaping (GS) and probabilistic amplitude shaping (PAS) have been extensively studied to bridge the gap to the Shannon limit. GS methods allow unequal spacing among constellation points, but the non-Gray mapping induces a gap between the mutual information (MI) and the generalized mutual information (GMI) when binary forward error correction(FEC) codes are applied. PAS methods can only be used for square quadrature amplitude modulation (QAM), which greatly limits its application in real-world environments. Although the performance of PAS-64QAM, in principle, is able to approach the Shannon limit, its implementation penalty can't be neglected in a real-world environment.

High baudrate transponders have been designed to reduce the cost per bit to achieve beyond 200 Gb/s per wavelength data rates thanks to high-order M-ary quadrature amplitude modulation (M-QAM), high-bandwidth front-ends and digital signal processing (DSP) algorithms. In addition, flex-rate transmission can be achieved simultaneously by switching among different M-QAM formats together with variable-rate forward-error correction (FEC) codewords. Despite that fine bitrate granularity can be implemented in this manner, there is an unacceptable capacity gap towards the Shannon limit because of regular M-QAM formats. In theory, Gaussian-like constellation is able to operate near-Shannon performance, and geometric shaping (GS) has been demonstrated to work well with large constellation size when approximating the Gaussian feature (e.g., by placing the constellation symbols into non-uniform spacing. However, GS-QAM requires being redesigned at a different signal-to-noise ratio (SNR) to keep up the performance advantage over M-QAM in practice.

Alternatively, probabilistic shaping (PS) attempts to realize Gaussian-like characteristics through time superposition by transmitting each M-QAM symbol with a different probability. Probabilistic amplitude shaping (PAS) has been proposed to shape square M-QAM within ~0.1 dB away from the Shannon limit and demonstrated to have superior performance improvement over M-QAM and flex-rate adjustment by adjusting distribution matcher (DM) only. However, due to the symmetry constraints of PAS methods, the PS algorithm is not suitable for non-square M-QAM. Attempts have also been made using a truncated PAS-64QAM (e.g. removing the outer symbols with low probability to generate PAS-36QAM constellation), but with this technique, data transport systems suffer from capacity loss because of non-Gaussian characteristics.

SUMMARY

According to an aspect of the present invention, a system is provided for optical data transport, including controlling data transport across an optical transmission medium by generating two-dimensional (2D) distribution matchers (DMs) based on probabilistic fold shaping (PFS) and arbitrary probabilistic shaping (APS). The 2D PFS-based DM is can encode any N-fold rotationally symmetrical Quadrature Amplitude Modulation (QAM) format by applying the 2D PFS-based DM only to symbols in one quadrant based on a target entropy. A fold index yield uniform distribution is determined, and is utilized to carry generated uniform distributed parity check bits across the optical transmission medium. The 2D APS-based DM can encode any arbitrary modulation formats by encoding uniform binary data to generate non-uniform target symbols, and generating a probability distribution for the target symbols by indirectly applying the 2D APS-based DM based on a target probability distribution and a detected code rate of generated FEC code.

According to another aspect of the present invention, a method is provided for optical data transport. One or more two-dimensional (2D) distribution matchers (DMs) are generated based on probabilistic fold shaping (PFS), and the 2D PFS-based DMs can encode any N-fold rotationally symmetrical Quadrature Amplitude Modulation (QAM) format. The 2D PFS-based DM is applied only to symbols in one constellation quadrant based on a target entropy. A fold index yield uniform distribution is determined, and the fold index is utilized for carrying generated uniform distributed parity check bits across an optical transmission medium.

According to another aspect of the present invention, a method is provided for data transport. One or more two-dimensional (2D) distribution matchers (DMs) are generated based on arbitrary probabilistic shaping (APS), and the 2D APS-based DMs can optimize data transmission performance for any arbitrary modulation formats. Received uniform binary data is utilized to generate non-uniform target symbols, and a probability distribution for the target symbols is generated by indirectly applying the 2D APS-based DM based on a target probability distribution and a detected code rate of generated FEC code.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
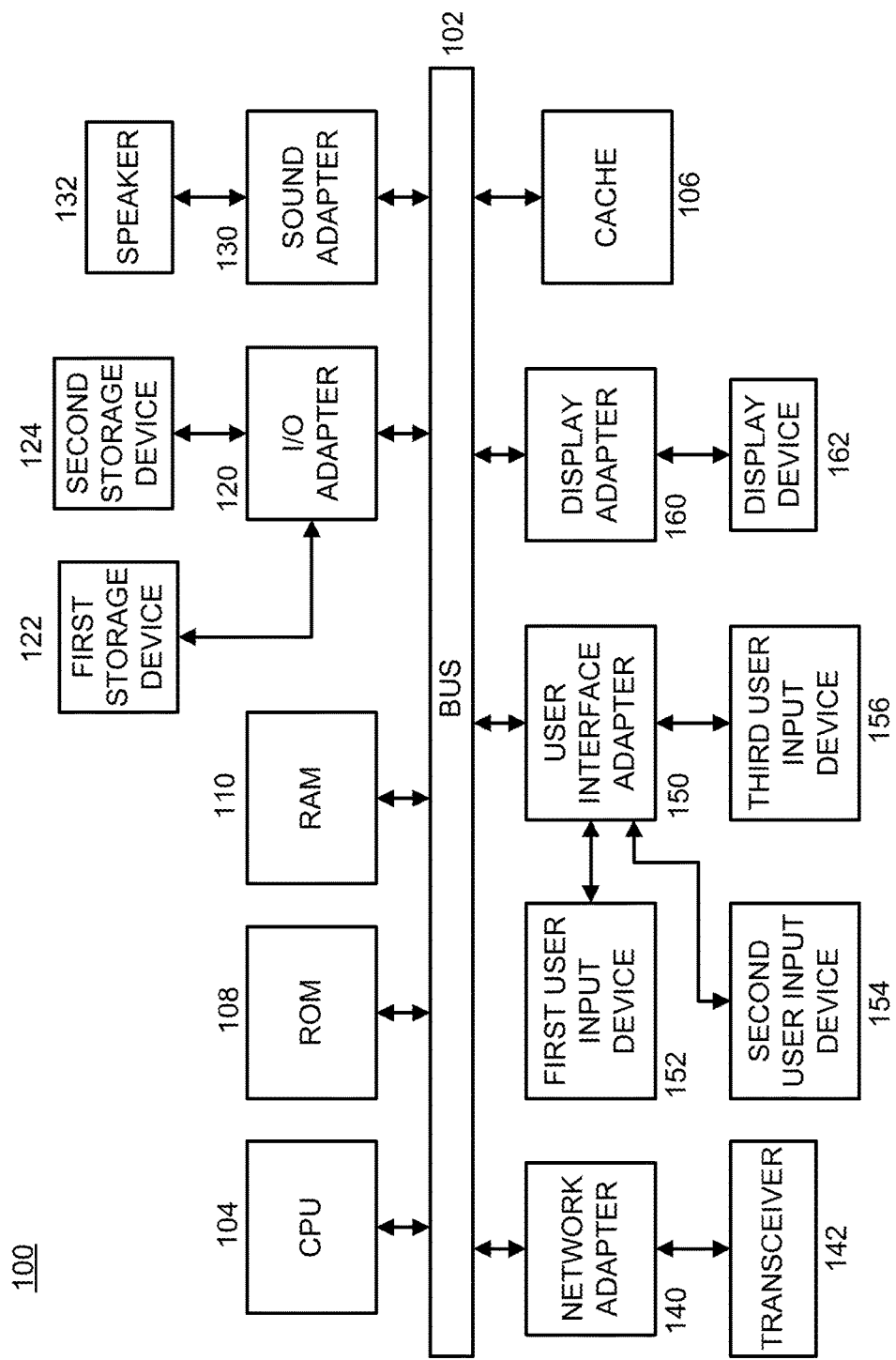
FIG. 1 is a block/flow diagram illustrating an exemplary processing system to which the present invention may be applied, in accordance with the present invention.

In accordance with the present invention, systems and methods are provided for data transport using universal probabilistic shaping (PS) based on PFS and/or using universal PS based on arbitrary probabilistic shaping (APS)

In one embodiment, one or more two-dimensional (2D) distribution matchers (DMs) based on probabilistic fold shaping (PFS) and arbitrary probabilistic shaping (APS) can be employed for data transport in accordance with the present invention. PFS can be used for any N-fold rotationally symmetrical QAM, while APS can be used for arbitrary modulation formats in accordance with various embodiments. A generalized pair-wise optimization (GPO) method can be applied to generate an optimized 32-ary signal constellation, for ease of illustration referred to hereinafter as "opti-32QAM", which is enabled by hybrid PS and GS systems and methods in accordance with the present invention. During testing, the performance of opti-32QAM is shown to be comparable to that of the PS-32QAM, and better than regular 32QAM by 0.9 dB, when capacity (C) is 3.33 bits/symbol (b/s). In a case of a C of 4 b/s, opti-32QAM outperforms PS-32QAM and regular 32QAM by 0.2 dB and 0.7 dB, respectively. Additionally, the real-world performance difference between the opti-32QAM and PAS-64QAM is less than 0.1 dB in accordance with various embodiments of the present invention.

In accordance with various embodiments, universal two-dimensional distribution matchers are constructed and/or employed to improve the performance of 32-ary quadrature-amplitude modulation (QAM) based on hybrid probabilistic and geometrical shaping in accordance with the present invention. Experimental results have shown that this method provides superior results to both probabilistically shaped 32QAM and regular 32QAM. Additionally, as compared to the well-known PAS-64QAM, the systems and methods of the present invention provide for easier generation and detection, and relieve the high hardware requirement of conventional systems and methods. As compared to conventional PAS systems and methods, the 2D distribution matcher in accordance with the present invention is universal (e.g., suitable for any kind of modulation format), thus providing significant advantages over any conventional systems and methods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block/flow diagram showing an exemplary processing system 100 to which the present invention may be applied is illustratively depicted in accordance with an embodiment of the present invention.

In one embodiment, the processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that systems 100, 300, 400, 800, and 1100, described with respect to FIGS. 1, 3, 4, 8, and 11, respectively, are systems for implementing respective embodiments of the present invention. Part or all of processing system 100 may be implemented in one or more of the elements of systems 300, 400, 800, and 1100, according to various embodiments of the present invention.

Further, it is to be appreciated that processing system 100 may perform at least part of the method described herein including, for example, at least part of methods 200, 300, 400, 700, 800, and 1000 of FIGS. 2, 3, 4, 7, 8, and 10, respectively. Similarly, part or all of system 1100 may be used to perform at least part of methods 200, 300, 400, 700, 800, and 1000 of FIGS. 2, 3, 4, 7, 8, and 10, respectively, according to various embodiments of the present invention.

Figure 2:
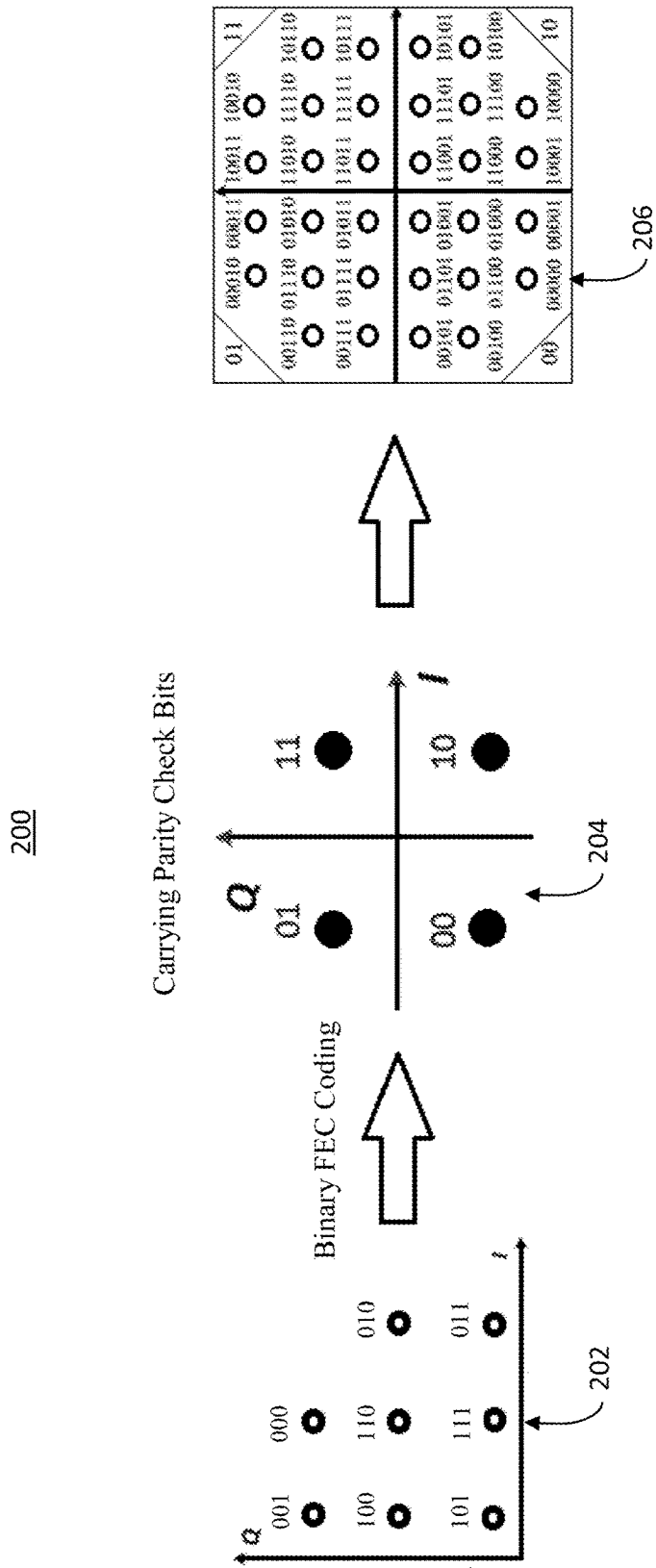
FIG. 2 is a block/flow diagram illustrating a high-level method for probabilistic fold shaping (PFS)-based N-fold rotationally symmetrical Quadrature Amplitude Modulation (QAM), in accordance with the present invention.

Referring now to FIG. 2, a high-level method 200 for probabilistic fold shaping (PFS)-based N-fold rotationally symmetrical Quadrature Amplitude Modulation (QAM) is illustratively depicted in accordance with an embodiment of the present invention.

In one embodiment, in a PFS based N-fold rotationally symmetrical QAM, the $\log_2(N)$ bits determining the fold index yield uniform distribution, which can be used to carry the parity-check bits after FEC encoding. The constellation points in one fold can be shaped by one or more distribution matchers (DMs) according to 2D Maxwell-Boltzmann distribution. Thereafter, the desirable probability distribution of each symbol will not be changed after the systematic FEC coding in accordance with various embodiments of the present invention.

In one embodiment, using a 4-fold 32QAM as an example for illustrative purposes, of the proposed PFS scheme, different constellation points in the first quadrant 202 indicate different probabilities, and a code rate of the FEC code is denoted by R. In some embodiments, the first and the fourth bits in the bit labeling are used to discriminate the fold index in accordance with the present invention. In the first quadrant 202, there are 8 constellation points which act as the base points to encode uniform bits into these 8 non-uniform symbols to achieve different entropy. After binary FEC coding, the resulting binary bits are further encoded by the channel code to produce uniform parity check bits in block 204, which can then encode the quadrature bits, and in this illustrative example, will be $1^{st}$ and $4^{th}$ bit. As a result, in accordance with various embodiments, the probability distribution 206 won't be affected by the FEC encoder, which will be described in further detail herein below.

Figure 3:
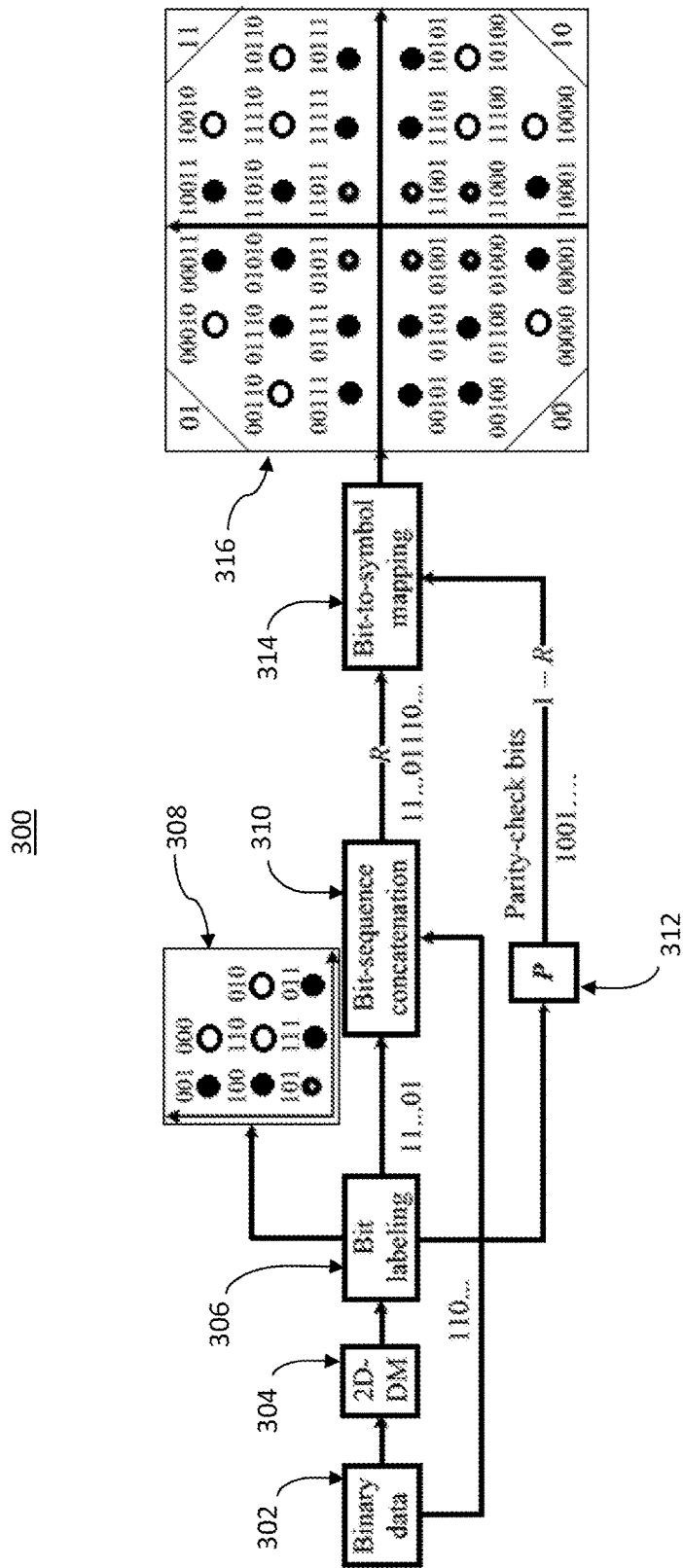
FIG. 3 is a block/flow diagram illustrating a system/method for data transport using universal probabilistic shaping (PS) based on PFS, in accordance with the present invention.

Referring now to FIG. 3, a system/method 300 for data transport using universal probabilistic shaping (PS) based on PFS is illustratively depicted in accordance with an embodiment of the present invention.

In one embodiment, the system/method 300 is employed to encode N-fold rotationally symmetrical QAM, and to transmit and/or receive the encoded data using any of a plurality of types of appropriate data transport mediums (e.g., fiber optic cable, wireless communications, etc.) in accordance with the present invention. The uniform binary data 302 can be encoded using one or more 2D-DMs 304, which can generate non-uniform symbols in, for example, the first quadrant based on the target entropy in accordance with the present invention. In block 306, non-uniform symbols can be labeled and mapped into bits, which can be used as input for the FEC encoding in block 312. In some embodiments, bit sequence concatenation may be performed in block 310. Exemplary resulting symbols and bits mappings are shown for a 32QAM scenario in block 308 in accordance with embodiments of the present invention. The resulting parity check bits in the FEC encoder 312 can be formed into quadrature bits using bit-to-symbol mapping in block 314 to rotate the constellation symbols as depicted in the first quadrant, as shown in block 308. The final generated constellation is output in block 316, and can be employed for optimal data transmission in accordance with various embodiments of the present invention.

In embodiments using PFS based N-fold rotationally symmetrical QAM, the $\log_2(N)$ bits can be employed to determine a fold index yield uniform distribution, which can be used to carry the parity-check bits after FEC encoding in block 312. Assuming, for example, a 4-fold 32QAM as an example shows a principle of the PFS scheme, where different shapes indicate different probabilities, and code rate of the FEC code is denoted by R. In an exemplary embodiment, the first and the fourth bits in the bit labeling of the 32QAM can be used to discriminate the fold index. In some embodiments, in block 304, the constellation points in one fold/quadrant can be shaped by the DM according to 2D Maxwell-Boltzmann (M-B) distribution, which is denoted as $P_{X_v}(x) = e^{-v|x|^2} / \Sigma_{x' \in X} e^{-v|x'|^2}$, where v is a scaling factor, x is the complex coordinate in one quadrant, and X is the constellation symbol. Thereafter, a desirable M-B distribution of the resulting 32QAM will not be changed after the systematic FEC coding in accordance with various embodiments of the present invention.

The system/method 300 for data transport using PFS N-fold rotational symmetry provides significant, measurable advantages over conventional systems and methods by, for example, applying a 2D distribution matcher 304 only to the symbols in one quadrature, and using the bits which determine the fold index to carry the uniform distributed parity-check bits in accordance with various embodiments of the present invention.

Figure 4:
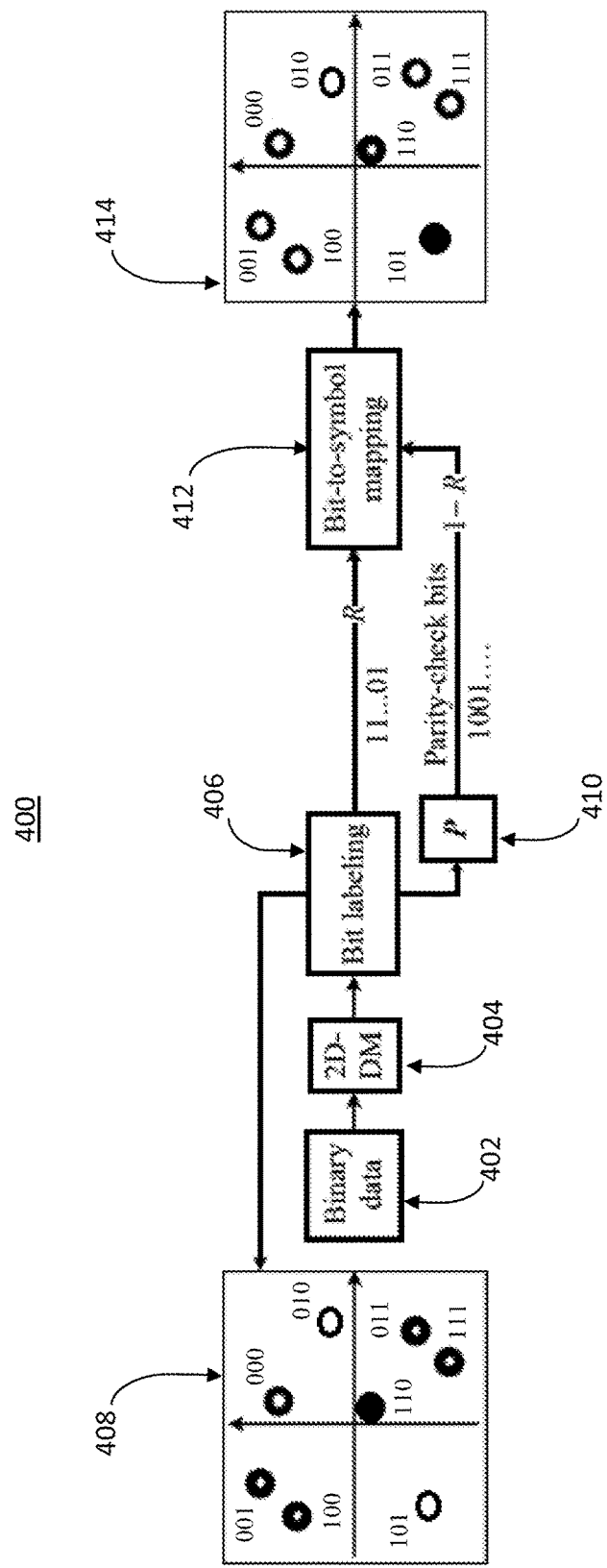
FIG. 4 is a block/flow diagram illustrating a system/method for data transport using universal PS based on arbitrary probabilistic shaping (APS), in accordance with the present invention.

Referring now to FIG. 4, a system/method 400 for data transport using universal PS based on arbitrary probabilistic shaping (APS) is illustratively depicted in accordance with an embodiment of the present invention.

Figure 7:
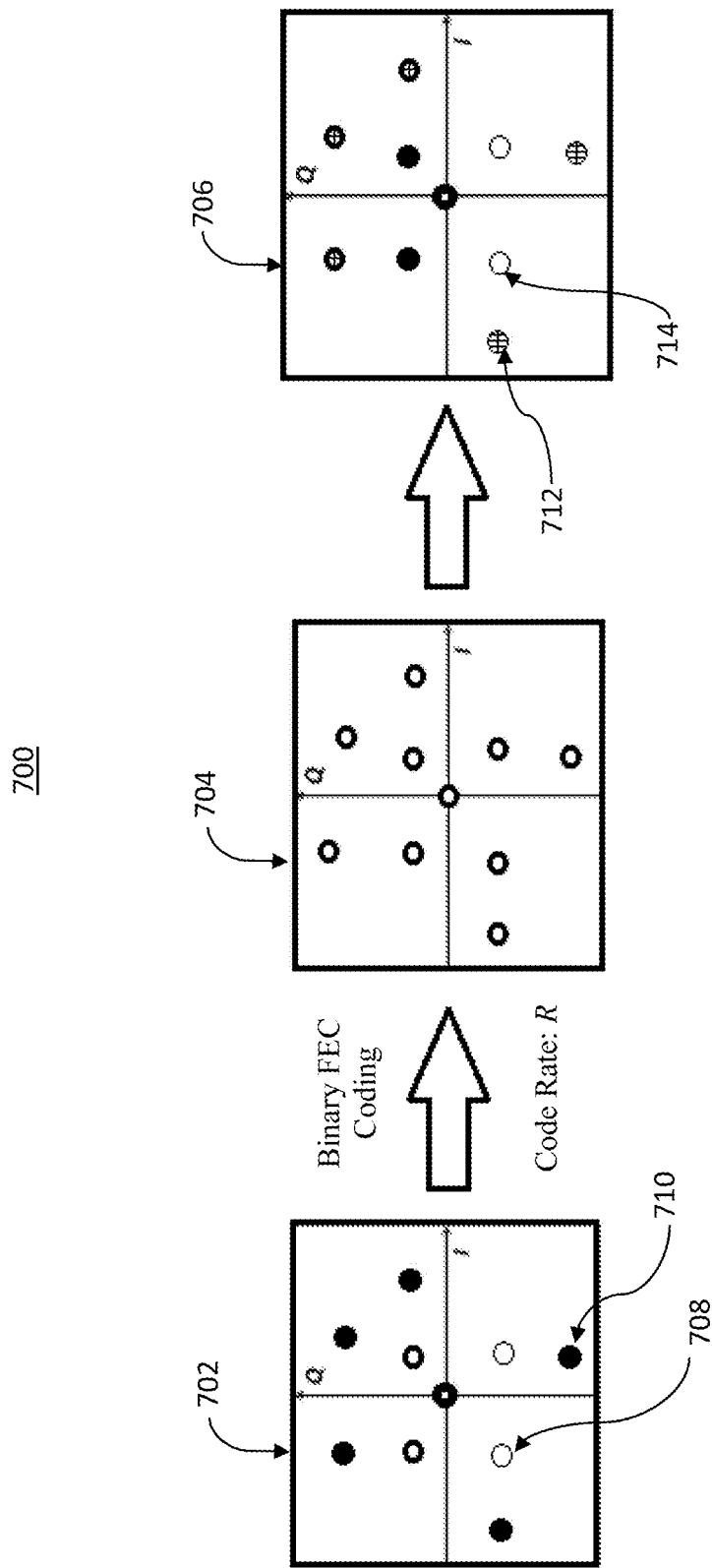
FIG. 7 is a block/flow diagram illustrating a probability distribution of Multi-Level Quadrature Amplitude Modulation (M-QAM) based on APS, in accordance with the present invention.

In some embodiments, the system/method 400 can employ an APS-based M-QAM scheme for data transport in accordance with the present invention. The uniform binary data 402 can be encoded using one or more 2D-DMs 404 to generate all the non-uniform symbols. In block 406, the nonuniform distributed bits can be used after the DM 404 as the information bits in block 410 to generate FEC parity check bits, which can be mapped to symbols in block 412. In various embodiments, the symbols generated by the parity bits can be generally uniformly distributed at 1/M for M-QAM constellation. Assuming the target symbol probability is $P(X_i)$, i=1 . . . M, the overall relationship among them can be derived as $P(X_i)=RP(\xi_i)+(1-R)/M$, where the corresponding probability after DM is $P(\xi_i)$, R is the coding rate, and M is the constellation size. An exemplary probability distribution of M-QAM after APS using the system/method 400 in is shown in FIG. 7, and is described in further detail herein below. The final generated constellation is output in block 414, and can be utilized by, for example, a hardware transmitter to provide optimal data transmission over a transmission medium (e.g., fiber optic cable, wireless, etc.) in accordance with various embodiments of the present invention.

In embodiments using arbitrary QAM formats, a universal DM can be employed for efficient, accurate shaping using an APS-based MQAM system/method 400 in accordance with the present invention. The symbol sequence generated by the 2D-DM may not yield M-B distribution, and the information bits obtained from bit labeling in block 406 can be appended with the uniform distributed parity check bits 402. After the bit-to-symbol mapping in block 412, the parity-check bits, in general, can be mapped to MQAM symbols, with the final output being depicted in block 414. For ease of illustration, assuming the target M-B distribution of the MQAM is P(X), the distribution of the MQAM after DM is P($\xi$), and the uniform distribution after the bit-to-symbol mapping of the parity-check bits is 1/M, the overall relationship among them can be derived as $P(X)=RP(\xi)+(1-R)/M$. Therefore, the final M-B distribution of MQAM can be achieved after the systematic FEC coding in accordance with various embodiments of the present invention.

The system/method 400 for data transport using universal PS based on arbitrary probabilistic shaping (APS) provides significant, measurable advantages over conventional systems and methods by, for example, in the case of arbitrary modulation, indirectly applying the 2D distribution matcher to generate a probability distribution, which is pre-determined by the desirable distribution and the code rate of the FEC code in accordance with various embodiments of the present invention.

Figure 5:
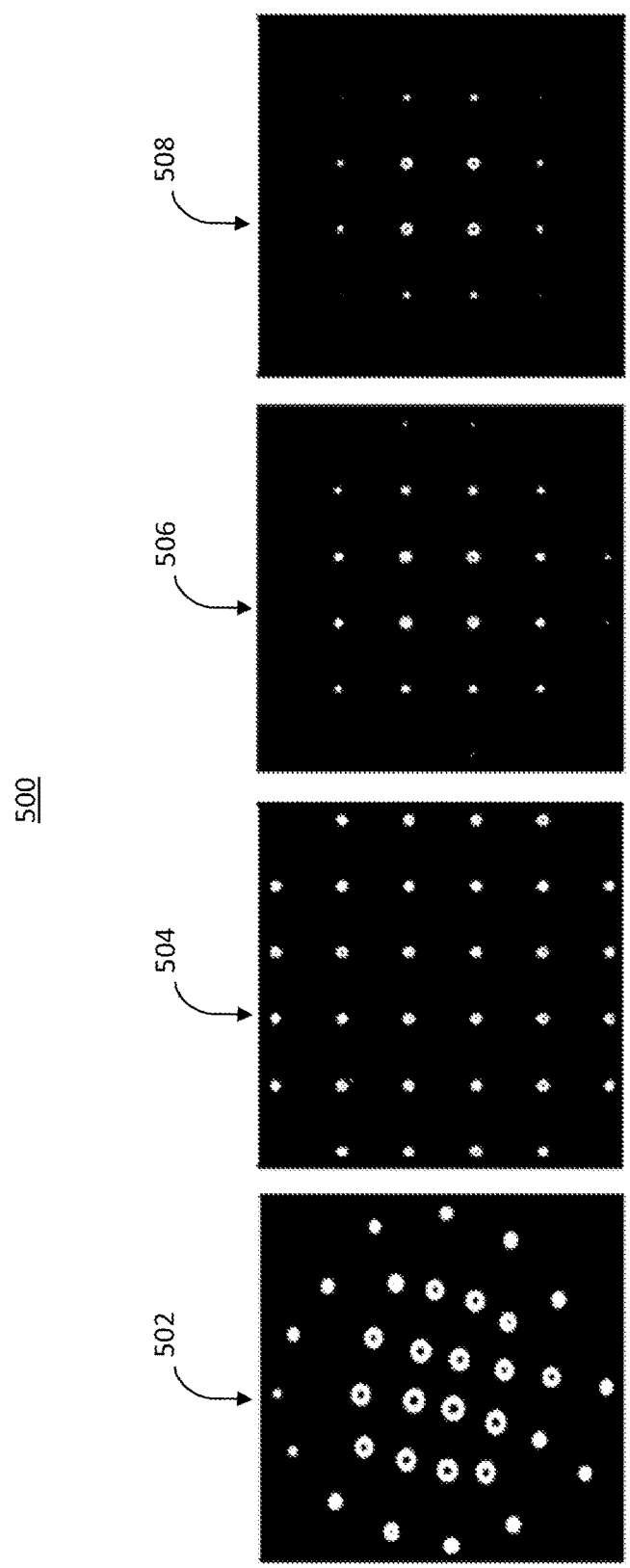
FIG. 5 is an illustration of exemplary 32-QAM constellation diagrams, in accordance with the present invention.

Referring now to FIG. 5, an illustration of exemplary 32-QAM constellation diagrams is shown in accordance with an embodiment of the present invention.

In some embodiments, a generalized pair-wise optimization (GPO) algorithm can be used for the generation of the hybrid PS/GS 32QAM (opti-32QAM) by maximizing the generalized mutual information (GMI) in accordance with the present invention. An exemplary resulting constellation diagram of the opti-32QAM is shown in constellation diagram 502, regular 32QAM is shown in constellation diagram 504, shallowly shaped 32QAM is shown in constellation diagram 506, and deeply shaped 32QAM is shown in constellation diagram 506 in accordance with various embodiments of the present invention.

Figure 6:
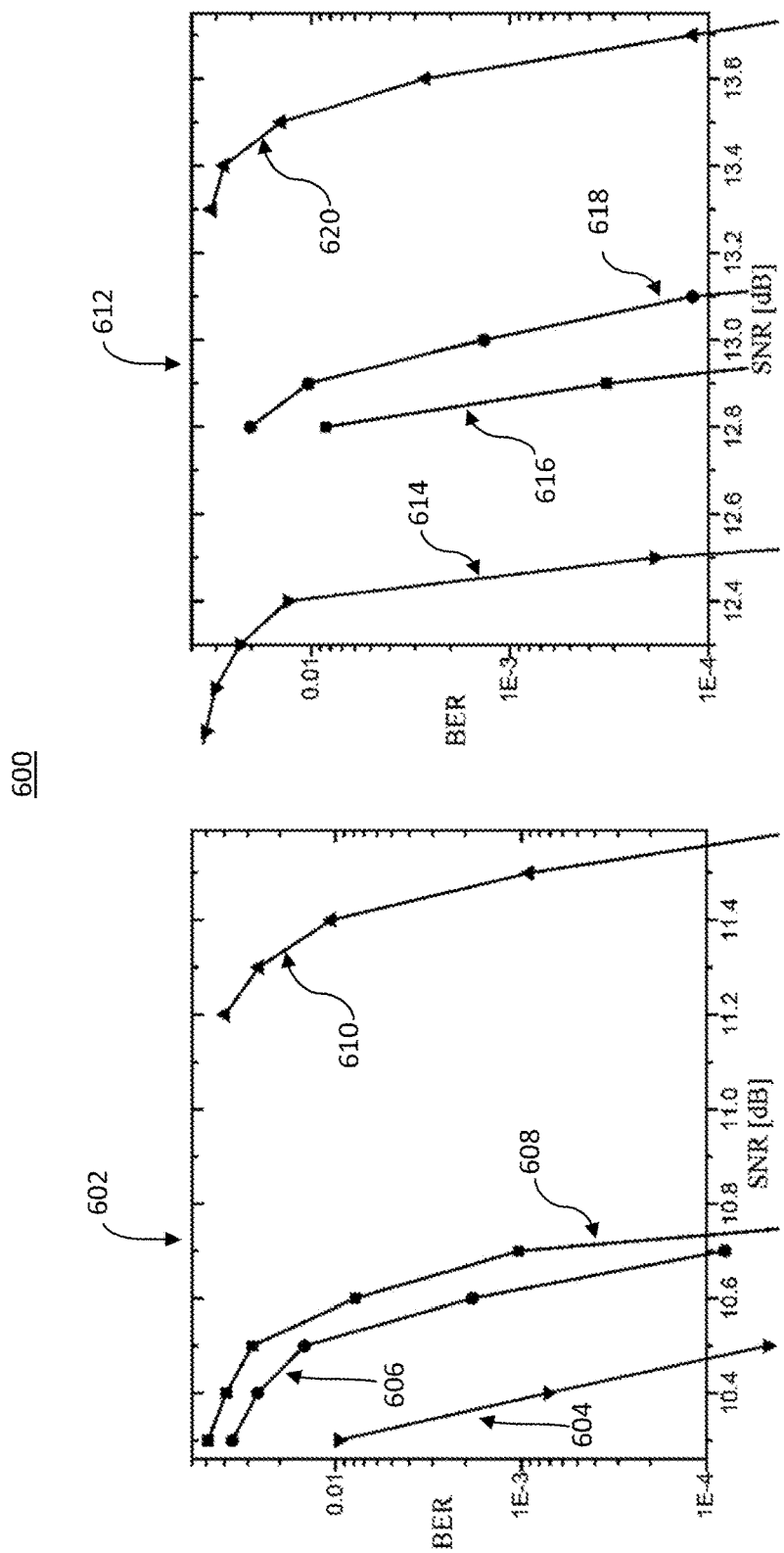
FIG. 6 is a graph illustrating simulated post-forward error correction (FEC) bit error rate (BER) versus signal-to-noise ratio (SNR) for a plurality of QAM formats, in accordance with the present invention.

Referring now to FIG. 6, a graph 600 showing simulated post-forward error correction (FEC) bit error rate (BER) versus signal-to-noise ratio (SNR) for a plurality of QAM formats is illustratively depicted in accordance with an embodiment of the present invention.

In one embodiment, the post-FEC bit-error rate (BER) performances as a function of signal-to-noise ratio (SNR) are graphically depicted, where DVB-S2 irregular binary low-density parity check (LDPC) codes can be used for channel coding in accordance with the present invention. For illustrative purposes, the performance of PAS-64QAM is used as a reference. For a fair comparison, the performances of the MQAM formats are compared under the same capacity, which is defined as C=H(P)−m(1−R), where H(P) represents the entropy of the PS-MQAM, and m=$\log_2$(M). In graph 602, for illustrative purposes, it is assumed that C=3.33 b/s. The performance of the opti-32QAM 608 for data transport in accordance with embodiments of the present invention is comparable to that of the PS-32QAM 606, and better than regular (R)-32QAM 610 by 0.8 dB. On the other hand, a 0.25 dB penalty is observed between opti-32QAM 608 and PAS-64QAM 604 at the BER of $10^{-4}$, which is expected given the higher constellation size of 64QAM.

In one embodiment, in graph 612, it is assumed for illustrative purposes that C=4 b/s. The opti-32QAM 616 in accordance with the present invention outperforms PS-32QAM 618 and R-32QAM 620 by 0.2 dB and 0.8 dB, respectively, at the BER of $10^{-4}$. However, opti-32QAM 616 can suffer a 0.4 dB SNR penalty at the waterfall region, compared to PAS-64QAM 614, but it is intuitive to expect that PAS-64QAM 614 is able to gain better performance than shaped 32QAM. Further, as shown in graphs 602 and 612, the simulation results indicate that employing opti-32QAM 614 for data transport in accordance with embodiments of the present invention provides significantly better performance than other 32QAM formats 618, 620.

Referring now to FIG. 7, with continued reference to FIG. 4, a system/method 700 for probability distribution of Multi-Level Quadrature Amplitude Modulation (M-QAM) based on APS is illustratively depicted in accordance with an embodiment of the present invention.

The system/method 400 of FIG. 4 provides a mechanism for data transport using an APS-based M-QAM scheme in accordance with various embodiments of the present invention, and an exemplary resulting probability distribution of the M-QAM after APS system/method 700 is described in further detail herein below. In accordance with various embodiments, different bits/symbols 708, 710, 712, and 714, can have different probabilities, and the different probabilities are depicted by different shapes for ease of illustration, in accordance with the present invention. In accordance with various embodiments of the present invention, in block 702, a 2D M-B distribution can be represented by $P_{X_\beta}(x)=e^{-\beta|x|^2}/\sum_{x' \in X} e^{-\beta|x'|^2}$, where β is the scaling factor, x is the symbol and X is the constellation alphabet. After binary FEC coding is performed, with code rate R, in block 704, uniform distributed carrying parity-check symbols can be represented by $P_X(x)=1/|X|$. In block 706, a probability distribution of M-QAM after employing APS in accordance with the present invention is shown, and can be represented by $P_{X_v}(x)=RP_{X_\beta}(x)+(1-R)/|X|$, where R is the coding rate.

Figure 8:
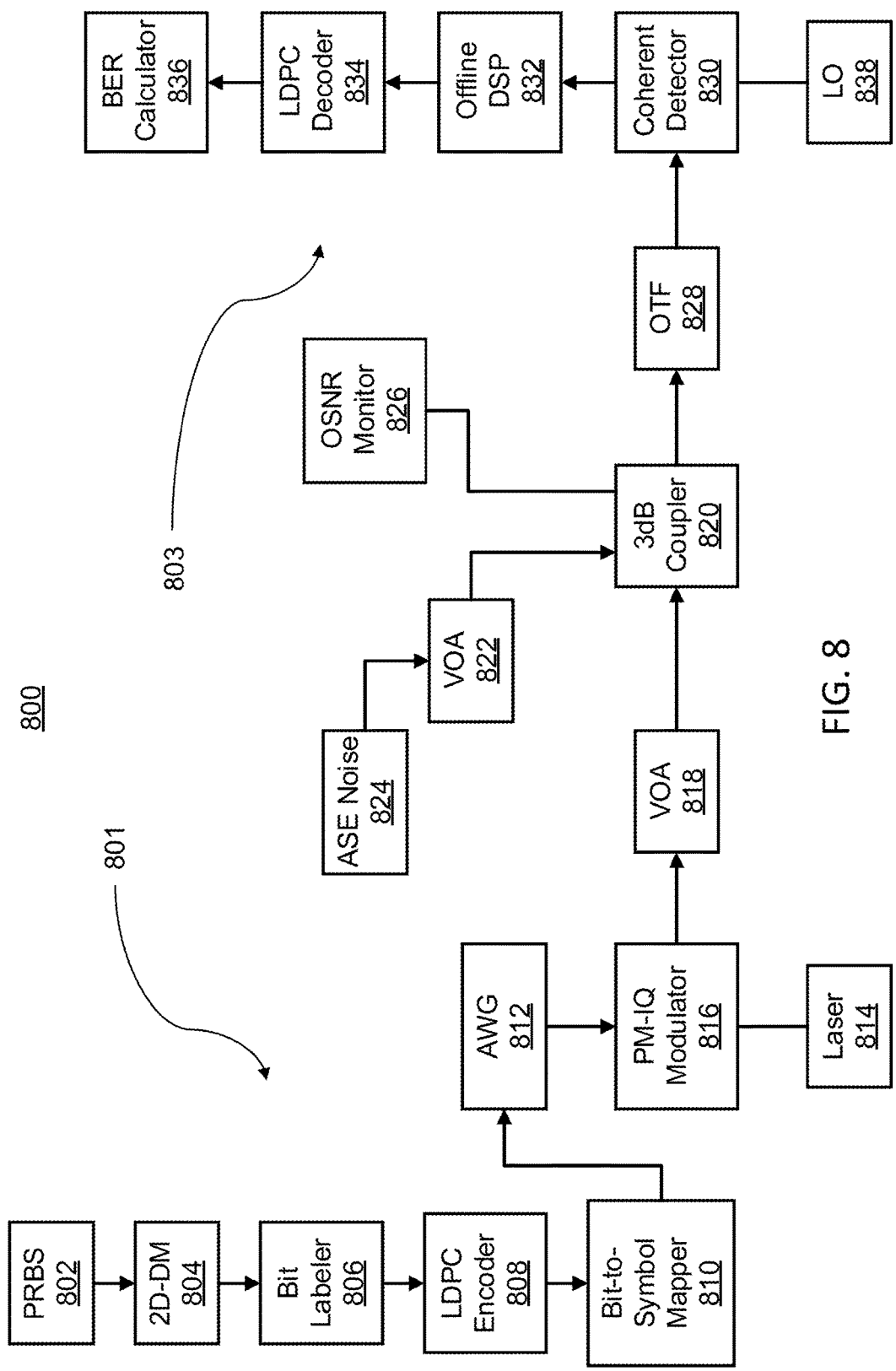
FIG. 8 is a block/flow diagram illustrating a system/method for data transport using M-QAM based on APS, in accordance with the present invention.

Referring now to FIG. 8, a system/method 800 for data transport using M-QAM based on APS is illustratively depicted in accordance with an embodiment of the present invention.

In one embodiment, at the transmitter side 801 of the system 800, a pseudorandom binary sequence (PRBS) 802 can be generated and input into the system 800, and the binary data can be mapped to the symbol sequence via one or more 2D DMs 804. After the bit labeling using a bit labeler 806, LDPC encoding using an LDPC encoder 808, and bit-to-symbol mapping using a bit-to-symbol mapper 810, as described in further detail with reference to FIGS. 3 and 4, the shaped QAM symbols can be pulse-shaped by an arbitrary waveform generator (AWG) 812 (e.g., 92 G Sa/s AWG) to generate electrical signals (e.g., 40 G Baud electrical signals). Such signals can be modulated by a polarization multiplexed (PM) I/Q modulator 816, and the PM-I/Q modulator can receive input from a laser 814 in accordance with the present invention.

In some embodiments, the resulting 40 G Baud PM-MQAM optical signal can pass through a variable optical attenuator 818 (VOA), and be mixed with amplified spontaneous emission 824 (ASE) noise, which can pass through a VOA 822 prior to mixing at a coupler (e.g., 3 dB coupler). An OSNR monitor 826 can be attached to the coupler 820, and the optical signal can be further filtered out by an optical tunable filter (OTF) 828 in accordance with various embodiments of the present invention.

In one embodiment, at the receiver side 803, a lower order mode 838 may be employed, and the signal may be received using a coherent detector 830 in accordance with the present invention. After coherent detection in block 830, the electrical signals can be digitized using, for example, a real-time oscilloscope with 80 G Sa/s sampling rate. The channel distortion can be equalized by a digital signal processor 832 (DSP) using DSP algorithms, an LDPC decoder 834 can decode the signal and perform a sum-product algorithm, and the BERs can be measured for performance evaluation using a BER calculator in accordance with various embodiments of the present principles.

Figure 9:
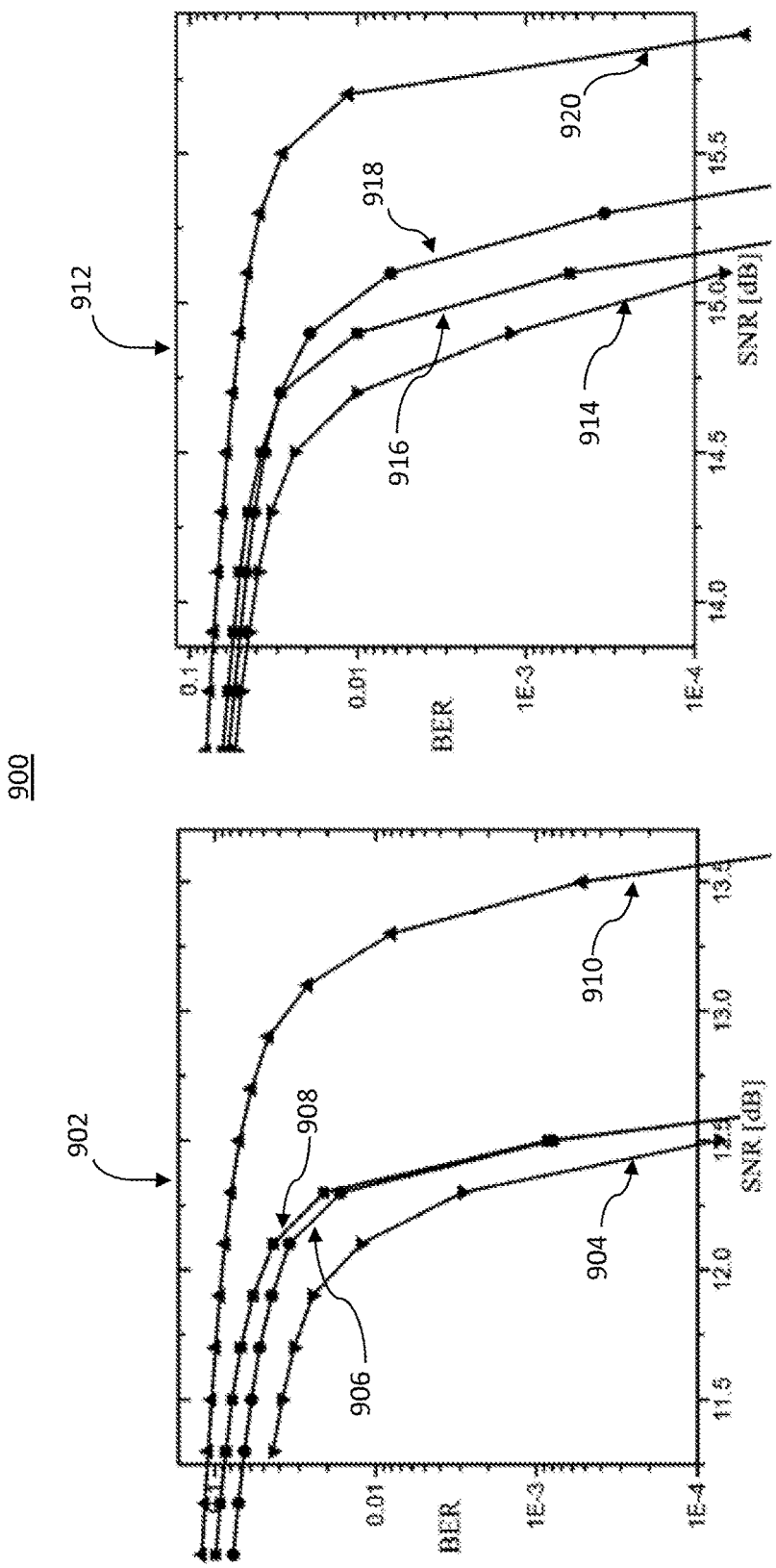
FIG. 9 is a graph illustrating measured post-FEC BER versus SNR for a plurality of QAM formats, in accordance with the present invention.

Referring now to FIG. 9, with continued reference to FIG. 6, a graph 900 showing measured post-FEC BER versus SNR performance for a plurality of QAM formats is illustratively depicted in accordance with an embodiment of the present invention.

In one embodiment, in graph 902, it is assumed for illustrative purposes that C=3.33 b/s. When the C is 3.33 b/s, the performance of opti-32QAM 908 is similar to that of the PS-32QAM 906, and better than R-32QAM 910 by 0.9 dB in the waterfall region. In graph 912, it is assumed for illustrative purposes that C=4 b/s. When the C is 4 b/s, the opti-32QAM 916 outperforms PS-32QAM 918 and R-32QAM 920 by 0.2 dB and 0.7 dB, respectively, at the BER of $10^{-4}$. As shown by the real-world experimental results in graphs 902 and 912, and contrary to the simulation results in graphs 602 and 612 in FIG. 6, PAS-64QAM 904, 914 is measured to have less than 0.1 dB SNR advantage over opti-32QAM 916 in cases of C=3.33 b/s and 4 b/s due to higher implementation penalty of PAS-64QAM 904, 914. This indicates that the measured results from employing the opti-32QAM 916 for data transport in accordance with various embodiments of the present invention provides comparable performance to that of the PAS-64QAM 904, 914, and significantly better performance that other 32QAM formats 918, 920 in a real-world environment.

Figure 10:
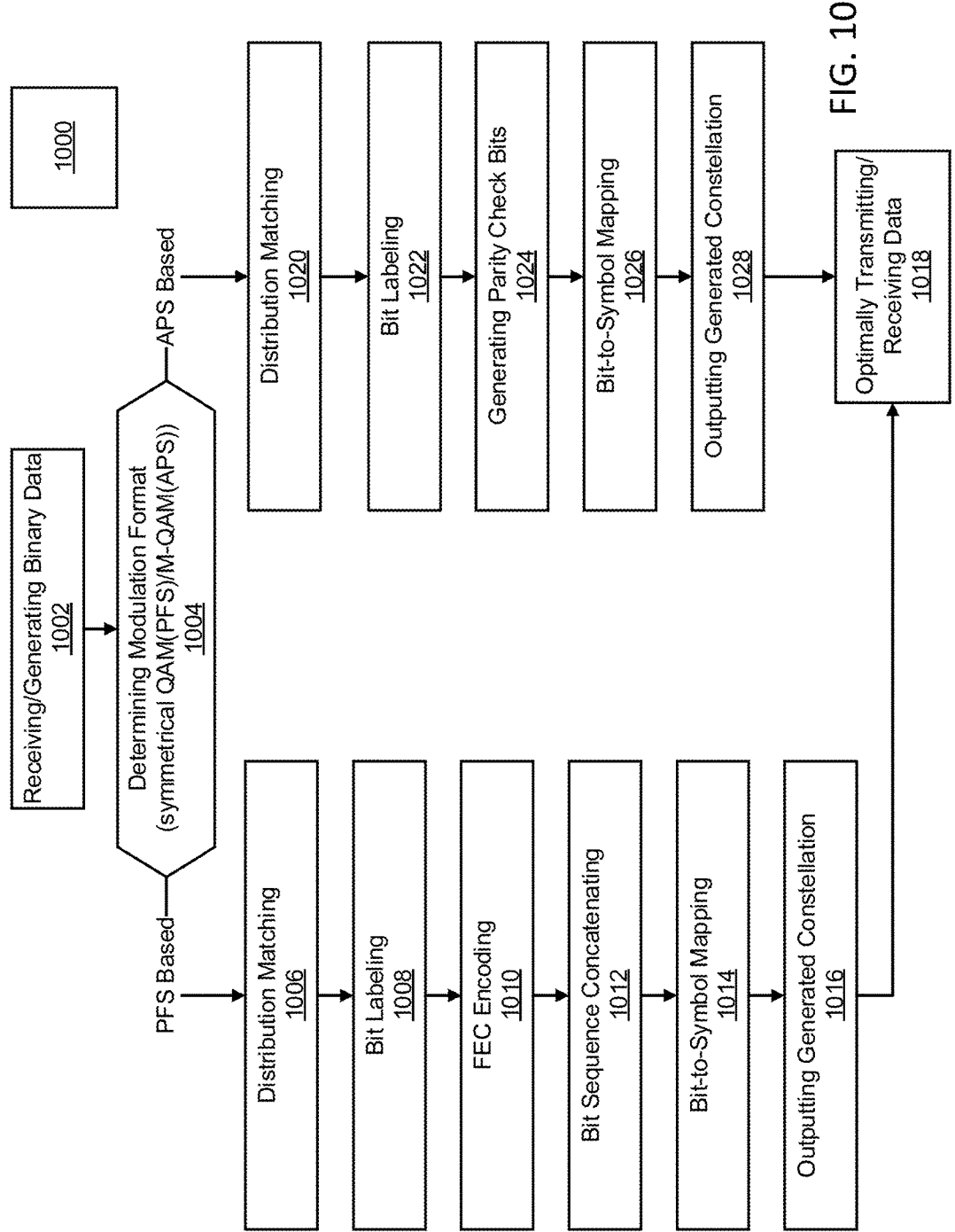
FIG. 10 is a flow diagram illustrating a method for data transport using M-QAM based on APS and/or universal PS based on PFS, in accordance with the present invention.

Referring now to FIG. 10 a method 1000 for data transport using universal PS based on PFS and/or using universal PS based on APS is illustratively depicted in accordance with an embodiment of the present invention.

In accordance with various embodiments of the present invention, the method 1000 can be employed to encode N-fold rotationally symmetrical QAM, and to transmit and/or receive the encoded data using any of a plurality of types of appropriate data transport mediums (e.g., fiber optic cable, wireless communications, etc.). Uniform binary data can be generated and/or received as input in block 1002, and a type of modulation format (e.g., N-fold rotationally symmetrical QAM, any M-QAM/arbitrary QAM) can be determined in block 1004 in accordance with various embodiments. In situations determined in block 1004 to include N-fold rotationally symmetrical QAM formats, a PFS based probabilistic shaping method can be performed, and the data can be encoded accordingly using one or more 2D-DMs in block 1006 to generate non-uniform symbols in, for example, only a first quadrant based on the target entropy, in accordance with various embodiments of the present invention. In block 1008, non-uniform symbols can be labeled and mapped into bits, which can be used as input for the FEC encoding in block 1010 in accordance with the present invention.

In some embodiments, bit sequence concatenation may be performed in block 1012, and the resulting parity check bits from the FEC encoding in block 1008 can be formed into quadrature bits using bit-to-symbol mapping in block 1014 to rotate the constellation symbols in the first quadrant, as discussed above with reference to block 1006. The final generated constellation is output in block 1016, and can be utilized by, for example, a hardware transmitter and/or receiver to provide optimal performance for data transmission over a transmission medium (e.g., fiber optic cable, wireless, etc.) in block 1018, in accordance with various embodiments of the present invention. In embodiments using PFS based N-fold rotationally symmetrical QAM, the $\log_2(N)$ bits can be employed to determine a fold index yield uniform distribution, which can be used to carry the parity-check bits after FEC encoding in block 1008.

In situations determined in block 1004 to include M-QAM/arbitrary QAM formats, data transmission can be performed using universal PS based on arbitrary probabilistic shaping (APS) in accordance with various embodiments of the present invention. The uniform binary data generated and/or received in block 1002 can be encoded, and distribution matching may be performed using one or more 2D-DMs in block 1020 to generate all the non-uniform symbols. In block 1022, bit labeling can be performed, and the nonuniform distributed bits can be used after the distribution matching in block 1020 as the information bits to generate FEC parity check bits in block 1024, which can be mapped to symbols in block 1026. In various embodiments, the symbols mapped to by the parity bits in block 1026 can be generally uniformly distributed at 1/M for M-QAM constellation.

The final generated constellation is output in block 1028, and can be utilized by, for example, a hardware transmitter and/or receiver to provide optimal performance for data transmission over a transmission medium (e.g., fiber optic cable, wireless, etc.) in block 1018, in accordance with various embodiments of the present invention.

In accordance with various embodiments of the present invention, the method 1000 provides two universal DMs performing distribution matching in blocks 1006 and 1020, which can be applied for N-fold rotationally symmetrical QAM formats and arbitrary QAM formats, respectively, to generate hybrid PS/GS and/or PS-32QAM formats for providing optimal performance for data transmission using any of a plurality of transmission mediums (e.g., fiber optic cable, wireless, etc.). The method 1000 for optimal data transmission provides significant, measurable advantages over conventional systems and methods, as shown by the real-world experimental results depicted in graphs 902 and 912 of FIG. 9.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for optical data transport, comprising:
   a memory operatively coupled to a processor device, the processor being configured to control data transport across an optical transmission medium by:
      generating two-dimensional (2D) distribution matchers (DMs) based on probabilistic fold shaping (PFS) and arbitrary probabilistic shaping (APS);
         wherein the 2D PFS-based DM is configured to encode any N-fold rotationally symmetrical Quadrature Amplitude Modulation (QAM) format by applying the 2D PFS-based DM only to symbols in one quadrant based on a target entropy, determining a fold index yield uniform distribution, and utilizing the fold index to carry generated uniform distributed parity check bits across the optical transmission medium; and
         wherein the 2D APS-based DM is configured to encode any arbitrary modulation formats by encoding uniform binary data to generate non-uniform target symbols, and generating a probability distribution for the target symbols by indirectly applying the 2D APS-based DM based on a target probability distribution and a detected code rate of generated FEC code.

2. The system as recited in claim 1, wherein the 2D APS-based DM is further configured to append information bits obtained from bit labeling with uniform distributed parity-check bits.

3. The system as recited in claim 2, wherein the uniform distributed parity-check bits are mapped to M-ary quadrature amplitude modulation (M-QAM) symbols.

4. The system as recited in claim 1, wherein constellation points in the one quadrant are shaped by the 2D PFS-based DM using a 2D Maxwell-Boltzmann distribution.

5. The system as recited in claim 4, wherein a first and a fourth bit in bit labeling of the N-fold rotationally symmetrical QAM are utilized to discriminate the fold index.

6. The system as recited in claim 5, wherein the QAM is a 32 QAM.

7. The system as recited in claim 1, further comprising transmitting and receiving shaped signals across the transmission medium.

8. A method for optical data transport, comprising:
   generating one or more two-dimensional (2D) distribution matchers (DMs) based on probabilistic fold shaping (PFS), the 2D PFS-based DMs being configured to encode any N-fold rotationally symmetrical Quadrature Amplitude Modulation (QAM) format;
   applying the 2D PFS-based DM only to symbols in one constellation quadrant based on a target entropy;
   determining a fold index yield uniform distribution, the fold index being utilized for carrying generated uniform distributed parity check bits across an optical transmission medium.

9. The method as recited in claim 8, wherein constellation points in the one quadrant are shaped by the 2D PFS-based DM using a 2D Maxwell-Boltzmann distribution.

10. The method as recited in claim 9, wherein a first and a fourth bit in bit labeling of the N-fold rotationally symmetrical QAM are utilized to discriminate the fold index.

11. The method as recited in claim 8, wherein the QAM is a 32 QAM.

12. The method as recited in claim 8, further comprising transmitting and receiving shaped signals across the transmission medium.

13. The method as recited in claim 8, further comprising performing bit sequence concatenation after bit labeling.

14. A method for data transport, comprising:
   generating one or more two-dimensional (2D) distribution matchers (DMs) based on arbitrary probabilistic shaping (APS), the 2D APS-based DM being configured to optimize data transmission performance for any arbitrary modulation formats;
   encoding received uniform binary data to generate non-uniform target symbols; and
   generating a probability distribution for the target symbols by indirectly applying the 2D APS-based DM based on a target probability distribution and a detected code rate of generated FEC code.

15. The method as recited in claim 14, wherein the 2D APS-based DM is further configured to append information bits obtained from bit labeling with uniform distributed parity-check bits.

16. The system as recited in claim 15, wherein the uniform distributed parity-check bits are mapped to M-ary quadrature amplitude modulation (M-QAM) symbols.

17. The method as recited in claim 14, further comprising transmitting and receiving shaped signals across a transmission medium.

18. The method as recited in claim 17, wherein the transmission medium is an optical transmission medium.

* * * * *